United States Patent Office 3,803,262
Patented Apr. 9, 1974

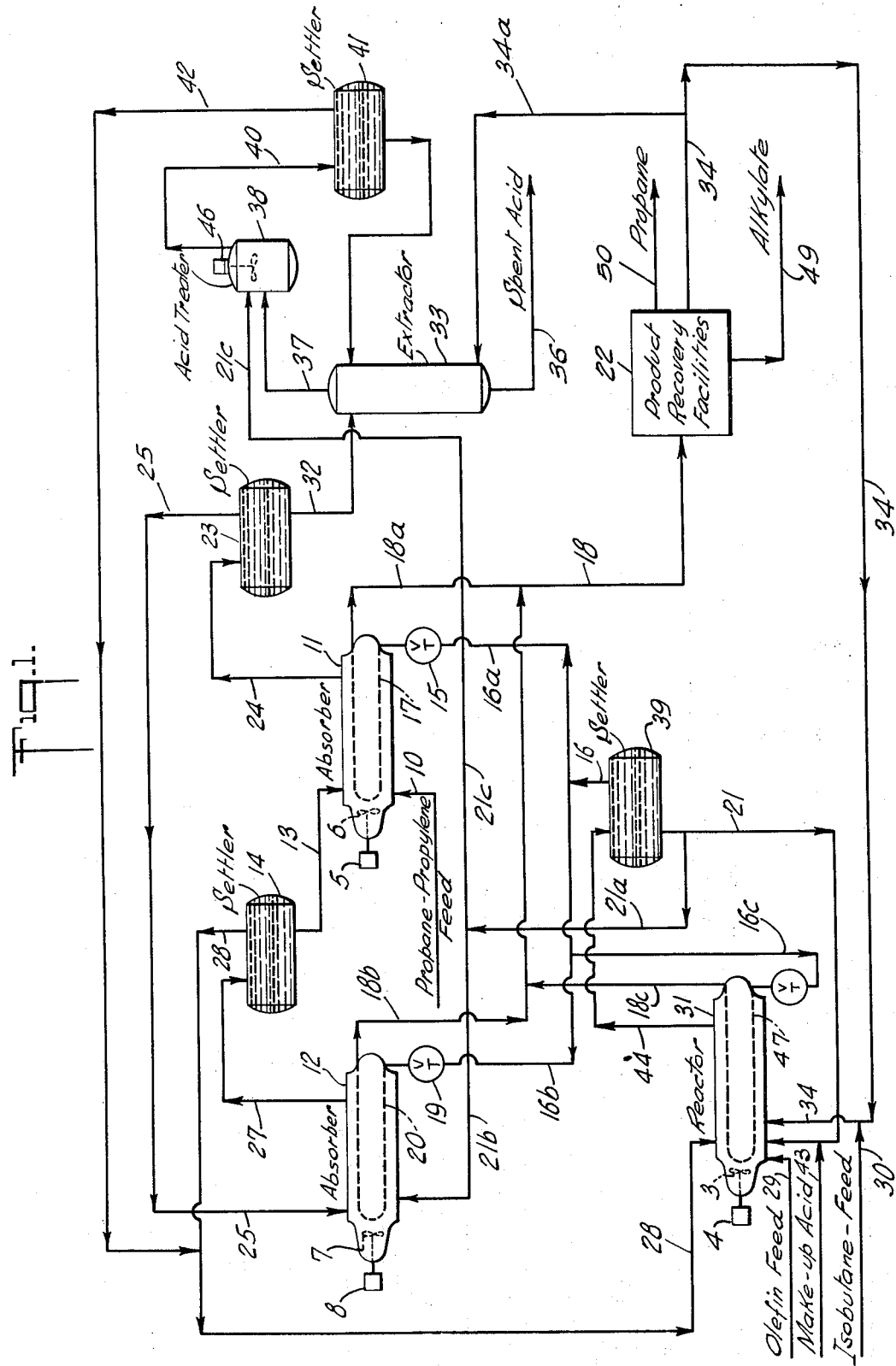

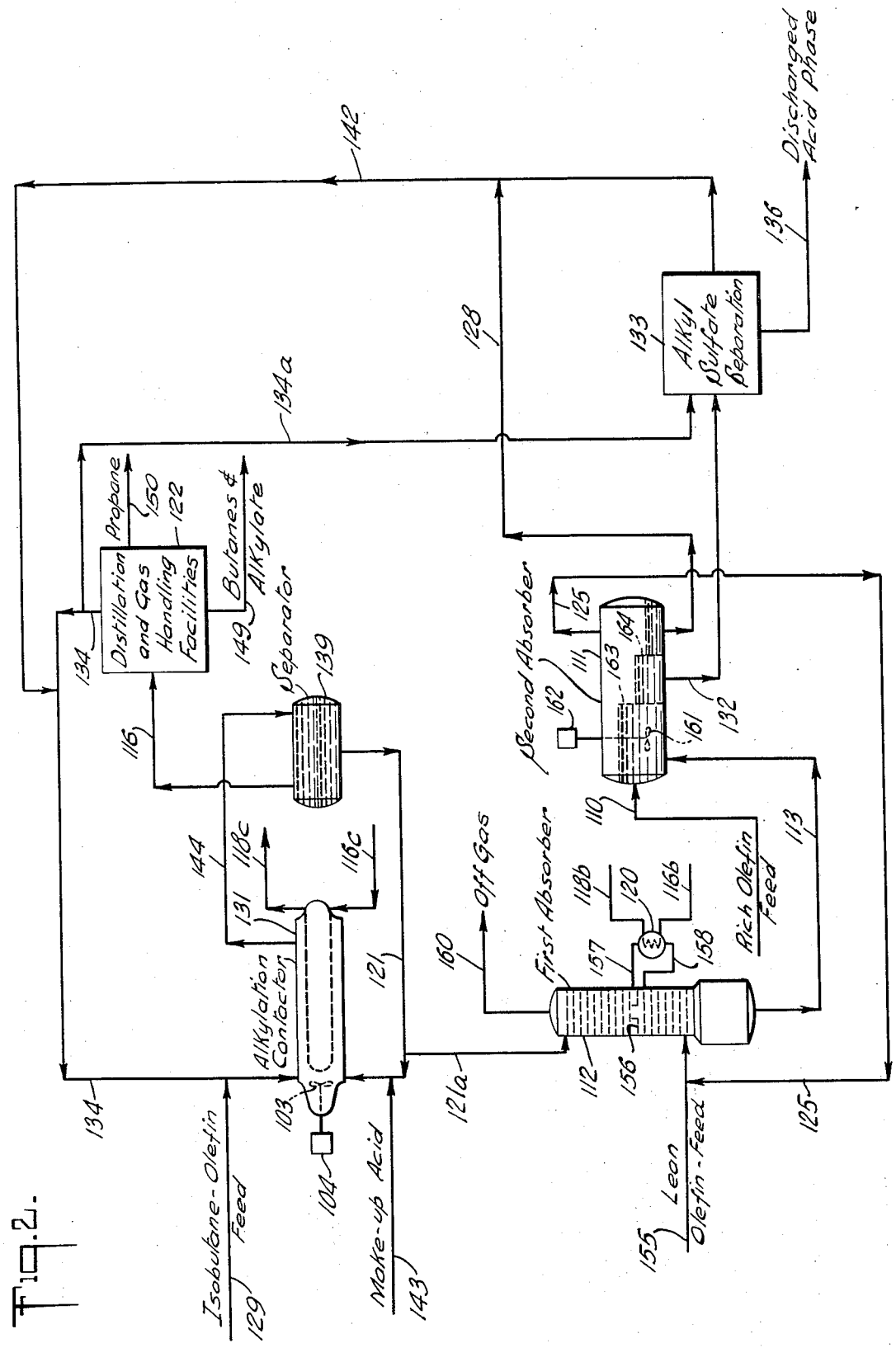

3,803,262
UTILIZATION OF SULFURIC ACID IN ALKYLATION
Arthur R. Goldsby, Chappaqua, N.Y., assignor to Texaco Development Corporation, New York, N.Y.
Continuation-in-part of application Ser. No. 510,904, Dec. 1, 1965. This application Dec. 1, 1967, Ser. No. 692,623
Int. Cl. C07c 3/54
U.S. Cl. 260—683.62     11 Claims

ABSTRACT OF THE DISCLOSURE

Used alkylation acid catalyst from the alkylation of an isoparaffin and an olefin with sulfuric acid catalyst is contacted with an excess of an olefin-containing hydrocarbon feed to form a reaction mixture comprising dialkyl sulfates and alkylation reaction contaminants. The reaction mixture is separated into an acid phase and a hydrocarbon phase, both phases containing dialkyl sulfates. The dialkyl sulfates in the acid phase are separated from the alkylation contaminants by extraction with isobutane. The hpdrocarbon phase containing dialkyl sulfates, and the dialkyl sulfates extracted from the acid phase are passed to the alkylation reaction zone.

CROSS-REFERENCE TO RELATED APPLICATIONS

This application is a continuation-in-part of copending application Ser. No. 510,904, filed Dec. 1, 1965, now abandoned, which in turn is a continuation-in-part of then copending application Ser. No. 386,486, subsequently issued as U.S. Pat. 3,324,301, Feb. 8, 1966, and which in turn is a continuation-in-part of then copending application Ser. No. 50,161, filed Aug. 17, 1960, and now abandoned.

BACKGROUND OF THE INVENTION

Field of the invention

This invention is directed to improvements in the utilization of sulfuric acid catalyst used in chemical reactions. More particularly, it is directed to improvements in the alkylation of olefins with isoparaffins or aromatics in the presence of a sulfuric acid catalyst wherein the catalyst is impaired by the accumulation of alkylation contaminants and the catalyst effectiveness is restored by the absorption of an olefin in used sulfuric acid, treatment of the absorption mixture to eliminate alkylation contaminants, and alkylation of the treated absorption product.

Description of the prior art

There are many sulfuric acid alkylation plants operating to make high quality motor fuel by the reaction of isobutane with olefins using a sulfuric acid catalyst. These plants experience a rather high acid catalyst consumption, on the order of 0.4 to 1.0 pound of acid per gallon of alkylate, and in some cases even higher. The used or spent acid catalyst from these plants must be disposed of in some manner. In most cases it is returned to the acid supplier for a small credit as a source of sulfur. In any case, the net cost of the acid catalyst to the operator of the alkylation plant is a major item in the overall cost of producing alkylate. The problem is becoming more serious as more alkylate is being used in fuel for automobiles and the prices of sulfur and sulfuric acid are rising. The acid consumption in alkylation and the corresponding cost have come down over the years since 1939, but no major improvements have been made in the recovery of the spent acid in spite of a great need over many years. In general the spent alkylation acid is destroyed by burning to recover the sulfur as sulfur dioxide and ultimately as sulfuric acid. Burning the acid to recover it is a very drastic operation, and also costly. This is especially true when it is considered that the used alkylation acid from the alkylation of isobutane with olefins has a titratable acidity of about 90%, and is still quite all right for many uses, except for the one use as an alkylation catalyst for which it is needed.

It is known that acid catalyst may be recovered and regenerated in situ in the alkylation reaction zone by the absorption or reaction of an olefin with used sulfuric acid alkylation catalyst to form dialkyl sulfates, separation of the dialkyl sulfates for example, by extraction with isobutane, and alkylation of the dialkyl sulfates with isobutane using a sulfuric acid catalyst. In the alkylation step substantially pure 100 percent sulfuric acid is regenerated or recovered from the dialkyl sulfates. The effect of this is that less fresh make-up acid needs to be added to the alkylation zone, and the overall net acid consumption and costs are greatly reduced.

Summary of the invention

The improved alkylation process of this invention involves a unique combination of steps in the recovery of sulfuric acid, asd is integrated with the alkylation of isobutane with olefins using a sulfuric acid catalyst.

In accordance with the invention, separated sulfuric acid catalyst is contacted in an absorption zone with an olefinic hydrocarbon, such as propylene, in a stiochiometric excess of olefin sufficient to provide complete conversion of the sulfuric acid to dialkyl sulfates. Effluent hydrocarbon phase containing unreacted olefin is passed as an olefin feed to the alkylation zone and effluent acid phase comprising dialkyl sulfates and alkylation contaminants is treated to separate dialkyl sulfates which in turn are also passed as feed to the alkylation zone. When the olefin in the absorption zone is maintained in liquid phase, a portion of the dialkyl sulfates dissolve therein and pass with the hydrocarbon absorption effluent to the alkylation zone. Advantageously, the absorption zone is cooled by evaporation of a portion of the olefin hydrocarbon feed and the resulting olefin containing gas is recycled to a gas phase absorption step. In one embodiment of this invention, a gaseous olefin stream containing less olefin than the stoichiometric amount to convert all of the sulfuric acid to dialkyl sulfates is contacted with sulfuric acid catalyst in a first absorption zone effecting substantially complete stripping of olefin from the absorber tail gas. First absorption zone acid effluent containing both monoalkyl sulfates and dialkyl sulfates is then passed to a second absorption zone in contact with a stoichiometric excess of olefin sufficient to provide complete conversion of monoalkyl sulfates and sulfuric acid to dialkyl sulfates.

To go beyond the level of academic interest, and to be of commercial significance, it is necessary to remove alkylation contaminants and to recover at least about 80% of the used alkylation acid available for recovery, and preferably a higher percentage. Otherwise, since sulfuric acid has such a low unit cost, the investment and operating costs may amount to more than the saving in acid. An object of my invention is to obtain a high recovery of acid as dialkyl sulfates together with substantially complete utilization of the olefin feed.

A great many reaction variables in the various steps are involved, and there are many alternative possibilities in the various steps. In many cases, if the wrong reaction conditions or the wrong alternatives are selected, the results will be so poor as to be of no commercial value. The proper reaction conditions for the various steps and the proper selectiton of alternatives will be described later in the application.

When any acid recovery process is integrated with alkylation, it has numerous advantages. It results in a higher conversion of the acid to extractable sulfates, and thus enables used alkylation acid to be recovered at a lower cost than by conventional means. It results in a lower net acid consumption in alkylation and a corresponding lower cost of production for alkylate. Inerts, such as propane and n-butane may be eliminated from that part of the olefin feed which would normally be charged to alkylation, resulting in higher quality alkylate and a reduction in fractionation costs. It gives a more reliable running unit with less possibility of the acidity dropping rapidly in the alkylation section with accompanying adverse results.

BRIEF DESCRIPTION OF THE DRAWINGS

Having set forth the general nature of the invention, it will be best understood from the more detailed description accompanying the drawings. Although the drawing illustrate specific arrangements of apparatus in which the process of this invention may be practiced, it is not intended to limit the invention to the particular apparatus or materials described.

In the accompanying drawings, forming a part of this specification, FIG. 1 shows the invention with two absorbers operated to provide countercurrent contact of olefin and acid in combination with an alkylation unit using effluent refrigeration. FIG. 2 illustrates the use of gaseous olefin in a first stage of absorption and liquid olefin in a second stage of absorption with autorefrigeration of the second stage of absorption.

DESCRIPTION OF PREFERRED EMBODIMENTS

Referring to FIG. 1, acid phase from settler 14 comprising monopropyl sulfates, dipropyl sulfates and sulfuric acid is charged through line 13 to absorber 11. Propane-porpylene feed is charged through line 10 to absorber 11 in an amount to provide a stoichiometric excess of propylene to convert all of monoalkyl sulfate and remaining sulfuric acid to dipropyl sulfate. The contents of absorber 11 are intimately mixed by circulation with impeller 6 driven by motor 5. The temperature of absorber 11 is held at about 30 to 40° F. by passing alkylation hydrocarbon reaction mixture through lines 16 and 16a and pressure reduction valve 15 effecting vaporization of a part of the hydrocarbon and cooling of the resulting vapor-liquid mixture. The cooled vapor-liquid mixture is passed through cooling coil 17 in indirect heat exchange with the reactants in absorber 11.

Used alkylation acid catalyst of about 90% acidity is charged to absorber 12 through lines 21, 21a and 21b. Reaction mixture from absorber 11 is passed through line 24 to settler 23. Hydrocarbon phase comprising unreacted propylene and dipropyl sulfate separated in settler 23 is passed through line 25 to absorber 12. The acid and hydrocarbon phases are contacted in absorber 12 by rapid circulation with impeller 7 driven by motor 8. The temperature of absorber 12 is held at 30 to 40° F. by circulating alkylation hydrocarbon reaction mixture through lines 16 and 16b, pressure reduction valve 19 and cooling coil 20 in absorber 12. The effluents of coils 17 and 20 comprising vapor-liquid mixtures of alkylation products, unconsumed reactants and diluents are collected in lines 18a and 18b and passed through line 18 to conventional compression and distillation equipment indicated as product recovery facilities 22.

Reaction mixture from absorber 12 is passed through line 27 to settler 14. Separated hydrocarbon phase from settler 14 comprising unreacted propylene and dipropyl sulfate is passed through line 28 to alkylation reactor 31 wherein the propylene and dipropyl sulfate are reacted with isobutane as hereinafter described to form alkylate with the liberation of 100% sulfuric acid.

The acid phase from settler 23 is passed through line 32 to countercurrent extractor 33 near the top. Isobutane is also introduced to extractor 33 through line 34a near the bottom. Isobutane rising through extractor 33 dissolves dipropyl sulfate from the descending acid phase. Spent acid comprising an acid-oil complex of alkylation contaminants and water is discharged from extractor 33 through line 36. Hydrogen overhead from extractor 33 comprising an isobutane extract of dipropyl sulfate is passed through line 37 to acid treater 38. A small stream of used alkylation acid is also passed through line 21c to acid treater 38. Acid treater 38 is a mixer provided with propeller 45 driven by motor 46. Any polymeric oil and acid-oil complex which may be present in the extract from extractor 33 are removed by the acid in acid treater 38. The reaction mixture from acid treater 38 is passed through line 40 into settler 41.

The acid treated overhead from settler 41 substantially free of alkylation contaminants and comprising isobutane and dipropyl sulfate is passed through lines 42 and 28 to alkylation reactor 31.

Alkylation reactor 31 is a conventional contactor provided with cooling coil 47 and impeller 3 driven by motor 4. Fresh olefin feed, which may comprise propylene, butylenes, butylene polymer and the like, in line 29, isobutane feed in line 30 and recycled isobutane in line 34 are passed into alkylation reactor 31. Recycle acid catalyst from settler 39 in line 21 and a small amount of fresh sulfuric acid of 97.5–99.5% strength to make up for the small loss from the system in the spent acid from extractor 33 added through lines 43 are passed to alkylation reactor 31. Isobutane is alkylated by the olefins and alkyl sulfates in alkylation reactor 31 with a formation of high quality alkylate, and release of 100% sulfuric acid from the alkyl sulfates.

Reaction mixture from reactor 31 is passed through line 44 into settler 39. As previously mentioned a portion of the separated hydrocarbon phase from settler 39 is used to cool or maintain a suitably low temperature in absorbers 11 and 12 by indirect heat exchange. Another portion is used to cool alkylation reactor 31 by passing it through lines 16 and 16c, pressure reduction valve 48 and cooling coil 47. The liquid and vapor from cooling coil 47 comprising propane, isobutane and alkylate is withdrawn through line 18c and combined with the like mixture in lines 18a and 18b for recovery and distillation in product recovery facilities 22. Facilities 22 employ conventional compression and distillation systems for the separation of product alkylate discharged through line 49, isobutane which is recycled through line 34 and propane which is discharged through line 50.

In the method of FIG. 1, fresh olefin feed is charged only to absorber 11 and unreacted olefin from absorber 11 is shown as being charged to absorber 12 to which used alkylation acid is also charged. This flow effects countercurrent contacting of both olefin and acid and effects maximum olefin absorption since the leaner olefin stream is reacted with the stronger acid. However, fresh olefin may also be charged to absorber 12 through an olefin feed line not shown. In this case, hydrocarbon overhead from settler 23 in line 25 comprising isobutane and dialkyl sulfate is diverted from absorber 12 and charged directly to alkylation reactor 31. By charging the isobutane and dialkyl sulfate from settler 23 directly to alkylation rather than to absorber 12, it enables a greater percentage of the acid to be converted to extractable dialkyl sulfate, with a lower net acid consumption in alkylation and also a lower loss of olefin as alkyl acid sulfates in the spent acid from extractor 33.

In the event that olefin is fed to both absorption zones or under conditions such that substantially all of the olefin in the hydrocarbon phase of one of the contactors is absorbed, it may be desirable to divert that part of the separated hydrocarbon phase from the alkylation system because of the diluent hydrocarbons present. In this case, it is advantageous to recover the dissolved dialkyl sulfate from the hydrocarbon for example by flashing and send it to alkylation.

Absorption

In the absorption step as much of the acid as possible should be reacted with olefin to form dialkyl sulfate. Propylene is preferred as the olefin feed stock. The absorption can be carried out in either vapor or liquid phase, or in a combination of the two. For example, the bulk of the absorption, 70 to 85%, can be carried out in the vapor phase, usually with an excess of olefin, followed by liquid phase for the final portion of the absorption step for a high conversion of the acid to dialkyl sulfates, for example on the order of 90% or more. Advantageously, a concentrated olefin feed in liquid phase, such as from catalytic cracking, may be introduced in excess into a mixing pump which is used to pump the acid phase from the vapor phase absorption to the extractor for extraction of the dialkyl sulfate. In this pump any free sulfuric acid and alkyl acid sulfates are converted to dialkyl sulfates, so that on the order of 90% or more of the acid may be converted to dialkyl sulfates. Any unreacted excess olefin feed may be separated, as desired, or passed on to the extractor and recovered in the isobutane extract, and ultimately passed to the alkylation zone. Preferably the excess olefin feed containing dialkyl sulfate is passed directly to alkylation.

Used alkylation acid having a titratable acidity of 88 to 93% by weight is the preferred acid charge stock for the absorption step, although in some cases, for example, if amylenes are being alkylated, it may have a concentration as low as 80 to 85%. Acid from other sources, such as fresh acid, or acid from chemical reactions, and acid from the acid treatment of petroleum naphtha or lube oil may also be used.

When using strong acid with propylene, a temperature of 20 to 60° F. is satisfactory. When butylenes are used, especially isobutylene or isobutylene containing charge stocks, quite low temperatures and short times are advantageous. Isobutylene may be first removed advantageously by the use of weak acid of about 60 to 70% concentration, as covered in my copending application Ser. No. 516,448, filed Dec. 21, 1965.

Relatively concentrated olefin stocks such as those from catalytic cracking are preferred, although from an economic standpoint lean stocks such as lean propylene stock having only a value of fuel are advantageous.

The absorption step may be effected in contacting equipment well known in the art, for example mixer-settlers, centrifugal contactors, countercurrent towers, or two or more mechanically stirred reactors operating to give countercurrent flow. Countercurrent contacting is preferred in order to obtain a high conversion of the acid to dialkyl sulfates, and in most cases for a high conversion of the olefin.

When the absorbers are operated in the liquid phase, the unreacted hydrocarbon will dissolve or extract an appreciable amount of dialkyl sulfate, for example, about 20% by weight of dipropyl sulfate at about 30° F. in propane-propylene. This results in a greater conversion of the acid to dialkyl sulfates, as it tends to keep shifting the equilibrium from free sulfuric acid and alkyl acid sulfate to dialkyl sulfate. It is desired to send the dipropyl sulfate to alkylation, and yet this is undesirable if too much propane or normal butane are present with it, since such diluents adversely affect the alkylation reaction. Such diluents may be removed and concomitantly cooling for the absorber furnished by flashing the settler overhead and passing the resulting cooled liquid-vapor mixture in indirect heat exchange with the absorber. The resulting liquid-vapor mixture after use for cooling is separated and the liquid containing dialkyl sulfate substantially reduced in propane or butane content is then sent to alkylation.

Extraction

It is desirable to extract substantially all of the dialkyl sulfate in the acid phase from the absorber for maximum yield of recovered acid. Extraction temperatures less than 100° F. are employed and low temperatures, for example, about 40 to 60° F., and short times of less than about 20 minutes are preferred. The extraction step may be effected in equipment known in the art, for example, mixer-settlers, centrifugal contactors or countercurrent towers, for example, a rotating disc contactor.

I prefer to use isobutane to extract the dialkyl sulfates from the absorber reaction mixture, but other hydrocarbons, such as propane and normal butane, or olefins, may be used.

Dialkyl sulfates have a greater relative solubility in hydrocarbon solvents than the alkyl acid sulfates. Thus, it is desirable to use efficient conditions in the extraction step so as to extract not only the dialkyl sulfates, but also the alkyl acid sulfates. Such conditions include a high solvent dosage on the order of six mols of solvent per mol of alkyl sulfate, or higher, raffinate recycle, multistage countercurrent extraction, and optimum charge rate for a given extraction vessel. In pilot unit runs much better results are obtained with a hydrocarbon solvent ratio, comprising principally isobutane, to dipropyl sulfate, of about 6 than with a ratio of 3, and somewhat better results with a ratio of 16 than with a ratio of 6. Under conditions of operation the volume ratio of isobutane to dipropyl sulfate is about the same as the mol ratio. For dibutyl sulfate, the mol ratio will be somewhat higher than the volume ratio, since the molecular weight of dipropyl sulfate is 180 and that of dibutyl sulfate is 210. The exact solvent dosage required will depend to some extent on the other conditions. For example, the solubility of the dialkyl sulfates increases with temperature, and a given size column, for example a rotating disc contactor, has an optimum throughput. However, it appears that the volume ratio of isobutane to dialkyl sulfate should always be above 3 and preferably above 6.

The raffinate or spent acid from the extraction step comprises water, alkyl acid sulfates, dialkyl sulfates and the reaction product of acid and polymeric oil formed during the alkylation, absorption, and acid treating steps. The extract comprises the hydrocarbon solvent, dialkyl sulfate, and a relatively small amount of alkyl acid sulfate. Extraction conditions are usually selected to approach as nearly as possible only acid-oil reaction product and water in the spent acid or acid phase, with all of the alkyl sulfates in the extract or organic phase.

In the event that difficulty is encountered in effecting good separation of the acid and hydrocarbon phases in settler 23, the separation can be facilitated by injecting a hydrocarbon into the absorption mixture by means not shown. For example, isobutane may be injected into the line 24 leading from the absorber to the settler. Advantageously, an amount up to the full amount which is normally charged to the extraction step, up to about 6 parts by volume for each volume of dialkyl sulfate or higher, or about 5 volumes per volume of acid phase, may be charged to the absorber reaction mixture with mixing so that the major portion of the dialkyl sulfate is extracted and a good separation takes place. When this is done, the hydrocarbon phase from settler 23 is sent to alkylation, and less dialkyl sulfate remains in the acid phase to be extracted in the usual extraction step. As a result a smaller size extraction tower may be used. This expedient of injecting hydrocarbon also applies to other absorber reaction mixtures, such as that from absorber 12.

The solubility of the dialkyl sulfates in isobutane increases with temperature. Thus, in general a higher solvent dosage is required with lower temperatures. The equilibrium between alkyl acid sulfate and the desired dialkyl sulfate is more favorable at lower temperatures and also less degradation of the acidic material takes place at lower temperatures. Advantage may be taken of these factors to obtain superior results, namely a higher yield of extracted dialkyl sulfate with less solvent. This may be done by using a reverse temperature gradient, that is, a higher temperature in the final steps of a multi-stage countercurrent extraction or in the bottom of the tower than in the initial stage or top of the tower. Relatively warm isobutane is charged into the final stage or near the bottom of a tower to the extent of at least 3 volumes of isobutane per volume of dialkyl sulfate, giving a temperature of about 60° F. in the bottom of the tower. In an earlier stage, or about half way up the tower, additional isobutane, such as cold refrigerant recycle isobutane at about 20 to 30° F. is charged, so that the temperature in the top of the tower is about 45 to 50° F.

When the extraction is effected at extract discharge temperatures of about 45 to 100° F., a larger percentage of the dialkyl sulfates in the extract may be thrown out of solution by chilling the extract to a temperature below about 40° F., or preferably below about 30° F. The dialkyl sulfate thus separated is quite pure and free of alkylation contaminants. Therefore, it is a preferred charge stock for alkylation. The chilling may be done in a number of ways, such as by evaporating a portion of the hydrocarbon, or by indirect heat exchange with refrigerant recycle isobutane which is at about 20° F. This chilling procedure may also be applied to the hydrocarbon phase from an absorber, for example the overhead from settlers 14 and 23, especially if the settlers are operated at about 40° F. or higher. Unreacted propane-propylene in settler 14 will dissolve about 20% of dipropyl sulfate at about 30° F., and more above 30° F. Approximately 50% of the dipropyl sulfate may be thrown out of solution by chilling the separated hydrocarbon phase to about 20° F.

Polymeric oil contaminant in the absorber-extractor extract is quite unsaturated and it reacts readily with strong sulfuric acid, such as fresh make-up acid used for the alkylation step, or used alkylation acid of about 90% concentration. Also, strong sulfuric acid will remove any acid-oil complex present. Thus, if desired, the absorber-extract may be acid treated prior to charging it to alkylation, and optionally after removal of any excess unreacted olefin. Quite good results are obtained by acid treating polymeric oil in isobutane solution with used alkylation acid of about 90% concentration at a temperature of 85° F. and a time as long as one hour. However, a temperature not over about 40 to 60° F. and a short time on the order of a few minutes or less are preferred. Actually a very short time such as would be obtained in the mixing with a pressure drop orifice appears to be satisfactory.

Alkylation

In general the conditions for the alkylation step are those which are well known in the art. However, the bulk of the make-up acid is charged to alkylation as alkyl sulfates from the recovery section, and only a minor proportion of the acid is charged as the fresh make-up acid of the usual 98 to 99.5% concentration. Since the alkyl sulfates are substantially water free the trend is for the system catalyst, when using the acid recovery process, to be of lower water content, and, in general, of superior quality in that a lower end point alkylate of higher octane value is obtained. Of course, if desired, less drying of charge stocks may be used, and in such a case the water content of the system catalyst may be as high as in conventional operation without acid recovery. Usually the water content of the system catalyst without acid recovery is about 2.5% by weight, or in the range of about 2.5 to 4.5%, when charging fresh make-up acid of 97.5 to 99.5% concentration. Under the same conditions, when using this acid recovery process, the water content is usually below about 2.5% or in the range of about 1.0 to 2.5%. The sulfuric acid in the alkylation system is usually maintained within a range of about 88 to 95% by purging spent acid from the system. In a multiple reactor system, preferably the acid of the lowest concentration is purged and sent to the acid recovery system.

A large excess of isobutane is used, for example, as much as 60 to 80 volume percent of the hydrocarbons in the alkylation reaction mixture. Consequently, a large quantity of isobutane must be recovered and recycled for reuse in the alkylation process. It is also available for the recovery process as described.

In addition to the olefin which is charged to the alkylation step in the form of alkyl sulfates additional fresh olefin is usually charged to the alkylation step. For example, when propylene and/or butylenes, and especially propylene, are used for the absorption step, it is advantageous to use butylenes also in the alkylation step. As the net acid consumption is reduced, the amount of olefin required for reaction in the acid recovery section is also reduced, usually being in the range of 10 to 25% of the total olefin, although it may be even less.

EXAMPLE I

In the following example, the feed stocks shown in Table I are employed in the apparatus of FIG. 1.

TABLE I

| | In weight percent | | |
|---|---|---|---|
| | Isobutane | Propane-propylene | Butane-butylene |
| Ethane | | 0.4 | |
| Propylene | | 62.3 | 0.1 |
| Propane | 6.9 | 33.7 | 2.7 |
| Isobutane | 91.1 | 3.6 | 24.6 |
| n-Butane | 2.0 | | 11.0 |
| Isobutylene | | | 15.9 |
| Butylene-1 | | | 9.5 |
| Butylene-2 | | | 22.9 |
| Pentanes | | | 3.3 |
| Total | 100.0 | 100.0 | ≥00.0 |

10 cc. per minute of used alkylation acid from the settler 39 titrating 91.0% was charged to absorber 12 at about 25° F. Fresh propane-propylene feed at the rate of 45.0 cc. per minute was charged to absorber 11 at about 30° F. Unreacted propane-propylene from absorber 11 separated in settler 23 was charged to absorber 12. The hydrocarbon phase or unreacted propane-propylene from absorber 12 separated in settler 14 comprised 11.8% dipropyl sulfate. The acid phase from absorber 11 separated in settler 23 comprising 80.6% dipropyl sulfate and 15.3% propyl acid sulfate was passed at a rate of 24.2 cc. per minute to a rotating disc contactor extractor 33 near the top. 315.0 cc. per minute of the isobutane feed was charged to the rotating disc contactor near the bottom. A temperature gradient was maintained in extractor, the bottom temperature being about 55° F. and the top temperature about 65° F. Overhead from the extractor comprising 83.8% isobutane, 5.7 dipropyl sulfate, and 0.3% propyl acid sulfate was passed to a 600 cc. mechanically agitated reactor at about 80° F. along with 0.2 cc. per minute of used alkylation acid of 91.0% concentration. The acid treated product was passed to a settler 41 separating a hydrocarbon phase at the rate of 341.2 cc. per minute comprising 84.2% isobutane, 5.8% dipropyl sulfate and 0.1% propyl acid sulfate.

105.5 cc. per minute of the butane-butylene feed in line 29, 315.4 cc. per minute of the isobutane feed in line 30, and 0.4 pound per hour of 97.5% sulfuric acid in line 43 were charged together with the hydrocarbon phases from settlers 14 and 41, recycle acid in line 21 and recycle isobutane in line 34 to a Stratco alkylation reactor 31 with efficient mixing held at 40 to 45° F. Reaction mixture was passed continuously to a settler 39. The hydrocarbon phase produced at a rate of 749 cc. per minute was caustic and water washed and stabilized to remove most of the butane and lighter hydrocarbon producing approximately 50 gallons per day of desired alkylate product.

Spent acid from the acid treater 38 was produced at the rate of 1.3 cc. per minute.

The spent acid from extractor 33 at the rate of 3.8 cc. per minute corresponds to an acid consumption of 0.18 pound per gallon of alkylate. A corresponding control run without acid recovery gave an acid consumption of 0.88 pound per gallon of alkylate.

Approximately 90% of the used alkylation acid was converted to dipropyl sulfate and approximately 90% of the dipropyl sulfate formed was sent back to alkylation wherein the sulfuric acid was regenerated or recovered. Overall, approximately 80% of the used alkylation acid was recovered. The reactions of sulfuric acid with propylene and butylenes are equilibrium reactions, and by the method of operation described it is not possible to convert all of the acid to extractable dialkyl sulfates; some will remain as alkyl acid sulfate. In addition, with the extraction conditions used it is not possible to extract all of the dialkyl sulfates formed.

The spent acid from extractor 33 had an analysis of approximately 2.5% water, 10% acid-polymeric oil complex, 10% dipropyl sulfate and 77.5% propyl acid sulfate.

The research octane of the total alkylate from the acid recovery run was 95.5 clear and 107.0 with 3.0 cc. of Tel. The motor octane was 92.6 clear and 106.8 with 3 cc. Tel. The alkylate from the control run without acid recovery had a research octane clear of 94.7 and 105.9 with 3.0 cc. of Tel.

Referring to FIG. 2, a lean olefin feed gas for example, an absorber tail gas, is passed through line 155 together with absorber flash gas from line 125 to first absorber 112. Absorber 112 is a countercurrent contacting tower for vapor-liquid contacting. In absorber 112, the rising gas is countercurrently contacted with used sulfuric acid alkylation catalyst introduced into the top of absorber 112 through line 121a. Absorber 112 is provided with an intermediate trap tray 156 for the separation of downflowing liquid which is withdrawn through line 157 and cooled in intercooler 120 before return to absorber 112 through line 158. Coolant for intercooler 120 is supplied through line 116b and effluent coolant is withdrawn through line 118b. Absorber 112 is operated with an excess of acid so that substantially complete stripping of olefin from the feed gas is achieved. The remaining off gas withdrawn through line 160 is substantially free of olefins and may be discharged for fuel use. Acid containing dissolved monoalkyl and dialkyl sulfates collects in the bottom of absorber 112 and is withdrawn through line 113 and passed to second absorber 111.

In second absorber 111, a rich olefin feed liquid stream introduced through line 110 is contacted with acid phase in a first compartment formed by weir 163. The acid and hydrocarbon phases are agitated by mixer 161 driven by motor 162. The absorption temperature is maintained by autorefrigeration, that is, by evaporation of a portion of the hydrocarbon feed from the reaction mixture. Hydrocarbon evaporated from the reaction compartment is withdrawn through line 125 and returned to first absorber 112. The hydrocarbon-acid phase overflowing 163 collects in a center compartment of absorber 111 formed between weirs 163 and 164 and therein separates into an acid phase which is withdrawn through line 132 and a hydrocarbon phase which overflows weir 164 into the end compartment. Hydrocarbon phase comprising unreacted olefin and dissolved alkyl sulfates is withdrawn through line 128.

Acid phase in line 132 is passed to alkyl sulfate separation facility 133 wherein the dissolved alkyl sulfates are separated from acid, for example, by extraction with isobutane from line 134a. Separated alkyl sulfates in line 142 together with the hydrocarbon phase in line 128 are passed through line 134 with isobutane to alkylation contactor 131. Discharge acid phase from alkyl sulfate separation facility 133 is withdrawn through line 136.

An isobutane olefin feed in line 129 is combined with the isobutane in line 134 and the streams containing alkyl sulfates from lines 128 and 142 and passed to alkylation contactor 131. Recycle acid in line 121 and make-up acid in line 143 are introduced into alkylation contactor 131. Alkylation contactor 131 is a conventional contactor wherein the contents are intimately mixed by impeller 103 driven by motor 104 and the reaction heat is removed by coolant introduced into cooling coil 147 through line 116c and discharged through line 118c. In alkylation contactor 131, the alkyl sulfates and olefin react with isobutane forming alkylate product. The resulting product mixture is withdrawn through line 144 to separator 139 wherein hydrocarbon phase is separated from sulfuric acid catalyst. Sulfuric acid catalyst is recycled through line 121 and the separated hydrocarbon phase is withdrawn through line 116 and passed to distillation gas handling facility 122. In facility 122, propane is separated and discharged through line 150, and butanes and product alkylate are separated and discharged through line 149. Separated isobutane is withdrawn through line 134 for recycle to alkylation contactor 131.

EXAMPLE II

In the following example, the feed stocks shown in Table II are employed in the apparatus of FIG. 2.

TABLE II

|  | Mol percent | | | |
|---|---|---|---|---|
|  | | Feed stock | | |
|  | Cracking plant gas | Propylene | Butylene | Isobutane |
| Non-condensibles | 17.0 | | | |
| Hydrogen | 21.0 | | | |
| Methane | 28.0 | | | |
| Ethylene | 6.0 | 0.5 | | |
| Ethane | 11.5 | 1.0 | | |
| Propylene | 8.5 | 51.0 | 0.1 | |
| Propane | 6.3 | 43.9 | 2.7 | |
| Isobutane | 0.8 | 1.9 | 34.6 | 6.9 |
| Butylenes | 0.4 | 1.3 | 48.3 | 91.1 |
| n-Butane | .4 | 0.4 | 11.0 | 2.0 |
| $C_5+$ | .1 | | 3.3 | |
| Total | 100.0 | 100.0 | 100.0 | 100.0 |

Cracking plant gas in an amount equivalent to 372 liquid barrels per day of propylene in line 155 and absorber off-gas in line 125 containing an equivalent of 57 liquid barrels of propylene are charged to the bottom of tower 112 at a pressure of about 5 p.s.i.g. Used alkylation acid catalyst at a rate of 143,563 pounds per day with a titratable acidity of 90.0 percent and at a temperature of 30° F. is charged through line 121a near the top of tower 112. As the acid flows down through tower 112, the heat of reaction with the olefin results in an increase in temperature. Heat is extracted from the tower in inter-cooler 120 by wihdrawing a stream of downflowing liquid from trap tray 156 through line 157 to cooler 120 and returning the liquid to tower 112 through line 158 at about 30° F. Essentially all of the propylene and butylene are reacted and are retained by the acid with conversion of about 75 percent of the sulfuric acid to propyl acid sulfate and dipropyl sulfate. Substantially all of the saturated hydrocarbons, non-condensibles, hydrogen and ethylene are discarged from the top of the tower as off-gas through line 160.

The acid phase from the bottom of absorber 112 is charged to absorber 111 operated in liquid phase with mechanical agitation at 15 p.s.i.g. pressure and a temperature of 40° F. The propylene feed stock shown in Table II is charged at 391 barrels per day to absorber 111. This feed contains about a 40 percent excess of olefin basis original acid to convert all of the sulfuric acid and propyl acid sulfate therein to dipropyl sulfate. By maintaining the pressure of absorber 111 at 15 p.s.i.g., a portion of the hydrocarbon feed is vaporized absorbing the exothermic heat of reaction and maintaining the temperature at about 40° F. Gas comprising about 57 barrels per day of equivalent liquid propylene is evolved from the absorber and recycled to absorber 112. The liquid absorption mixture is separated into acid and hydrocarbon phases each containing dissolved dipropyl sulfate.

The acid phase from the second absorber 111 comprising about 85 percent by weight of dipropyl sulfate is extracted by countercurrent contacting in liquid phase with six parts by volume of isobutane feed stock. The resulting dialkyl sulfate extract is separated from a raffinate containing most of the alkylation contaminants contained in the spent alkylation acid catalyst charged to the absorption system, as well as any acid soluble matter formed in the two absorbers. The isobutane extract, hydrocarbon phase separated from absorber 111, 4859 barrels per day of the butylene feed stock shown in Table II, an excess of isobutane feed stock, 13,563 pounds per day of fresh 99.5 percent sulfuric acid, and recycle acid catalyst are charged to alkylation contactor 131. Reaction products are separated by conventional means producing 5000 barrels per day of debutanized alkylate. The alkylate product has a research octane of 96.0 clear and 108.0 with 3.0 cc. of Tel and a motor octane of 93.0 clear and 107.0 with 3.0 cc. of Tel. Acid consumption amounts to 0.064 pound per gallon of alkylate compared with a consumption rate of about 0.7 pound per gallon which would be expected in conventional alkylation. Furthermore, 750 barrels per day of the product alkylate are derived from the cracking plant gas which could not be produced in conventional alkylation facilities since gas streams of such low olefin content containing non-condensible hydrocarbons and other gases are unsuitable for charge directly to alkylation.

In the simplest application of the invention when operated directly in combination with an alkylation unit the used alkylation acid is charged to the absorber for reaction with olefin, and dialkyl sulfate product is charged to alkylation. However, there are many different specific ways in which the invention may be used, for example, because of existing conditions or because of charge stocks, especially when used in combination with alkylation when more than one alkylation unit or reactor is operated, as exemplified by but not limited to the following with two alkylation units, A and B and recovery unit R:

(1) Used acid from A and B is charged to R and recovered acid from R is charged only to B.

(2) Used acid from A is charged to R and used acid from B is charged to A, and recovered acid from R is charged to B.

(3) Used acid from A is charged to B and used acid from B is charged to R, and recovered acid from R is charged to A.

(4) Used acid from A and B is charged to R, and recovered acid from R is charged to A and B.

(5) When applied to two alkylation reactors A and B (rather than to two alkylation units A and B) operated in series on acid with a single settler for both reactors, used acid from A is charged to B, used acid from B is charged to R, and recovered acid from R is charged to A. In principle this is the same as (2) above. It is the same principle also as in a multireaction zone reactor such as in a cascade reactor with series flow of hydrocarbon and emulsion with only a final settler, or in a multiple reactor unit with parallel flow of hydrocarbon and emulsion with a settler for each reactor or pair of reactors.

In any of the above general modifications a part of the acid set to recovery R may be from another source, including non-alkylation sources, and not from sources A and B.

Obviously, many modifications and variations of the invention as hereinabove set forth, may be made without departing from the spirit and scope thereof, and therefore, only such limitations should be imposed as are indicated in the appended claims.

I claim:

1. In a process for the alkylation of an isoparaffin with an olefin in the presence of a sulfuric acid catalyst in an alkylation zone containing a reaction mixture comprising isoparaffin, olefin, alkyl sulfates and sulfuric acid wherein the effectiveness of said sulfuric acid as a catalyst becomes impaired by the accumulation of alkylation contaminants, and wherein the effectiveness of said sulfuric acid catalysts is restored by contacting at least a portion of the sulfuric acid catalyst separated from said reaction mixture with an olefin forming alkyl sulfates which alkyl sulfates are separated from said alkylation contaminants and passed to said alkylation zone the improvement which comprises:

reacting said separated sulfuric acid catalyst in an absorption zone with a first olefinic hydrocarbon feed containing less than a stoichiometric amount of olefin sufficient to provide complete conversion of sulfuric acid to dialkyl sulfates in a first absorption zone, separating the reaction mixture from said first absorption zone on the basis of specific gravity into a first effluent hydrocarbon phase, comprising a portion of said alkyl sulfates and a first effluent acid phase comprising a portion of said alkyl sulfates, and a first effluent acid phase comprising monoalkyl sulfates, dialkyl sulfates and alkylation contaminants, further reacting said first effluent acid phase with a second olefinic hydrocarbon feed containing a stoichiometric excess of olefin sufficient to provide complete conversion of monoalkyl sulfates to dialkyl sulfates in a second absorption zone, separating the reaction mixture from said second absorpcion zone on the basis of specific gravity into a second effluent hydrocarbon phase comprising dialkyl sulfates, olefin and paraffins and a second effluent acid phase comprising a major portion of said dialkyl sulfates and alkylation contaminants, passing at least a portion of said second effluent hydrocarbon phase to said alkylation zone, separating dialkyl sulfates from said second effluent acid phase by extraction with isobutane, and passing said dialkyl sulfates separated from said second effluent acid phase to said alkylation zone.

2. The process of claim 1 wherein said first olefinic hydrocarbon feed is a gas and said second olefinic hydrocarbon feed is a liquid.

3. The process of claim 1 wherein said second olefinic hydrocarbon feed is a liquid, said second absorption zone is maintained at a pressure such that exothermic heat of reaction of olefin with monoalkyl sulfate and sulfuric acid is removed by vaporization of a portion of said second olefinic hydrocarbon feed, a second effluent hydrocarbon vapor phase, a second effluent hydrocarbon liquid phase, and a second effluent acid phase are withdrawn from said second absorption zone, and at least a portion of said second effluent hydrocarbon liquid phase is passed to said alkylation zone.

4. The process of claim 3 wherein said second effluent vapor phase is recycled to said first absorption zone.

5. The process of claim 1 wherein said first olefinic hydrocarbon feed comprises propylene.

6. The process of claim 1 wherein said second olefinic hydrocarbon feed comprises propylene.

7. The process of claim 1 wherein at least 80 percent of the sulfuric acid content of said sulfuric acid catalyst separated from said alkylation reaction mixture is converted to dialkyl sulfates.

8. The process of claim 1 wherein said second absorption effluent acid phase comprises at least 75 weight percent dialkyl sulfates.

9. The process of claim 1 wherein said first effluent acid phase is contacted with said second olefinic hydrocarbon feed in liquid phase in a pump.

10. In a process for the alkylation of an isoparaffin with an olefin in the presence of a sulfuric acid catalyst in an alkylation zone containing a reaction mixture comprising isoparaffin, olefin, alkyl sulfates and sulfuric acid wherein the effectiveness of said sulfuric acid is restored by contacting at least a portion of the sulfuric acid catalyst separated from said reaction mixture with an olefin alkyl sulfates which alkyl sulfates are separated from said alkylation contaminants and passed to said alkylation zone, the improvement which comprises;

contacting said separated sulfuric acid catalyst with a gaseous olefinic feed in a first absorption zone under vapor phase conditions with conversion of 70-85 percent of the sulfuric acid to dialkyl sulfates, withdrawing from said first absorption zone an effluent gaseous hydrocarbon phase and an acid phase comprising alkyl acid sulfate, contacting said acid phase from said first absorption zone with excess olefinic hydrocarbon feed in a second absorption zone with conversion of addition alkyl acid sulfate to dialkyl sulfate, withdrawing from said second absorption zone a second absorption effluent phase containing dialkyl sulfate, and a second absorption effluent acid phase comprising dialkyl sulfate and alkylation contaminants.

passing said second absorption effluent hydrocarbon phase to said alkylation zone, separating dialkyl sulfates from second absorption effluent acid phase by extraction with isobutane, and passing at least a portion of said dialkyl sulfates separated from said second absorption effluent acid phase to said alkylation zone.

11. The process of claim 10 wherein said first absorption zone effluent acid phase is contacted with excess olefin hydrocarbon feed in liquid phase.

References Cited
UNITED STATES PATENTS

| | | | |
|---|---|---|---|
| 2,381,041 | 8/1945 | De Jong | 260—683.61 |
| 3,227,774 | 1/1966 | Goldsby | 260—683.61 |
| 3,227,775 | 1/1966 | Goldsby | 260—683.61 |
| 3,442,972 | 5/1969 | Massa | 260—683.62 |

DELBERT E. GANTZ, Primary Examiner

G. J. CRASANAKIS, Assistant Examiner

U.S. Cl. X.R.

260—683.61

PO-1050
(5/69)

UNITED STATES PATENT OFFICE
CERTIFICATE OF CORRECTION

D#69,77-C1

Patent No. 3,803,262              Dated April 9, 1974

Inventor(s)   ARTHUR R. GOLDSBY

It is certified that error appears in the above-identified patent and that said Letters Patent are hereby corrected as shown below:

Column 1, line 67, "1939" should read --1938--.

Column 2, line 22, "asd" should read --and--.

Column 8, Table I, in column entitled "Butane-butylene, "24.6" should read --34.6-- and
"200.0" should read --100.0--.

Column 10, line 64, "discarged" should read --discharged--.

Column 11, line 70, "set" should read --sent--.

Column 12, line 36, "absortpion" should read --absorption--.

Column 13, line 10, following "olefin" insert --forming--; line 23, "addition" should read --additional --; line 26, following "effluent" insert --hydrocarbon--.

Signed and sealed this 17th day of September 1974.

(SEAL)
Attest:

McCOY M. GIBSON JR.
Attesting Officer

C. MARSHALL DANN
Commissioner of Patents